US008132331B1

(12) United States Patent
Rutherford

(10) Patent No.: US 8,132,331 B1
(45) Date of Patent: Mar. 13, 2012

(54) U-JOINT EXTRACTING TOOL AND METHOD OF USE THEREFOR

(76) Inventor: Brian Rutherford, Sacramento, CA (US)

( * ) Notice: Subject to any disclaimer, the term of this patent is extended or adjusted under 35 U.S.C. 154(b) by 996 days.

(21) Appl. No.: 12/077,459

(22) Filed: Mar. 19, 2008

(51) Int. Cl.
*B23P 17/00* (2006.01)

(52) U.S. Cl. ........... 29/898.08; 29/278; 29/251; 29/257; 29/264; 29/266

(58) Field of Classification Search ................ 29/201 R, 29/257, 201 D, 259, 256, 258, 264, 266, 287, 29/251
See application file for complete search history.

(56) References Cited

U.S. PATENT DOCUMENTS

| | | | | | |
|---|---|---|---|---|---|
| 3,786,544 | A | * | 1/1974 | Ferguson | 29/251 |
| 3,846,891 | A | * | 11/1974 | Elg | 29/261 |
| 4,019,233 | A | * | 4/1977 | Jirele | 29/261 |
| 4,343,075 | A | * | 8/1982 | Guptill et al. | 29/251 |
| 4,463,489 | A | * | 8/1984 | James | 29/259 |
| 4,510,661 | A | * | 4/1985 | Campa | 29/259 |
| 4,570,319 | A | * | 2/1986 | Skoworodko | 29/259 |
| 4,646,412 | A | * | 3/1987 | Eade | 29/259 |
| 4,658,488 | A | * | 4/1987 | Johnstead | 29/259 |
| 4,893,395 | A | * | 1/1990 | Crowder | 29/259 |
| 4,977,660 | A | * | 12/1990 | Maynard | 29/251 |
| 5,050,285 | A | * | 9/1991 | Wrage | 29/252 |
| 5,067,220 | A | * | 11/1991 | Combs et al. | 29/259 |
| 5,220,716 | A | * | 6/1993 | Lostra | 29/252 |
| 5,836,078 | A | * | 11/1998 | Aiken et al. | 29/898.07 |
| 5,857,252 | A | | 1/1999 | Jansen | |
| 5,956,831 | A | * | 9/1999 | McCarthy et al. | 29/263 |
| 5,966,792 | A | * | 10/1999 | James | 29/244 |
| 6,324,740 | B1 | | 12/2001 | Siedler | |
| 6,907,667 | B2 | | 6/2005 | Joyner et al. | |
| 7,051,412 | B2 | | 5/2006 | Hurtado, Jr. | |
| 7,115,037 | B2 | | 10/2006 | Schlegelmann et al. | |
| 2003/0041431 | A1 | * | 3/2003 | Heflin | 29/263 |

* cited by examiner

*Primary Examiner* — Derris Banks
*Assistant Examiner* — Azm Parvez
(74) *Attorney, Agent, or Firm* — Montgomery Patent & Design, LLC; Robert C. Montgomery; Joseph T. Yaksich

(57) ABSTRACT

An apparatus that aids in the removal of heavy-duty universal joints or Spicer® joints is herein disclosed. The apparatus is comprised of a metal plate approximately four (4) inches long and two-and-a-half (2½) inches wide. Two (2) outer apertures in the metal plate attach to the corresponding retaining bolt holes on an existing universal joint. The inner hole has a driver shaft driven by a three-quarter (¾) inch hex fitting. This driver shaft facilitates the removal of the joint caps of the universal joint. The apparatus is secure and will not slip or reposition itself while in use. When finished, the apparatus is removed from the drive shaft. The use of the apparatus allows for the removal of heavy-duty universal joints in an efficient manner.

14 Claims, 2 Drawing Sheets

U-JOINT EXTRACTING TOOL AND METHOD OF USE THEREFOR

FIELD OF THE INVENTION

The present invention relates generally to a tool for the extraction of U-joints in a quick and easy manner.

BACKGROUND OF THE INVENTION

About 130,000 companies in the U.S. are involved primarily in auto repair, with combined annual revenue of $65 billion. Aside from dedicated repair establishments, 45,000 gas stations, 24,000 new car dealerships, and branches of department store chains provide some car repair work. Thus, there is a large demand for automotive and industrial vehicle repair tools that are easy to use and offer time savings.

Heavy-duty universal joints, also known as Spicer® series, are commonly used on over-the-road vehicles and for industrial and off-highway applications. They are designed for long life at moderate torque levels, though they are capable of withstanding high momentary torques such as those encountered in starting a load or moving a vehicle. As effective as such joints are they do require periodic replacement or maintenance. Mechanics who work on such vehicles each subscribe to their own way of removing joints. However, many of these methods may subject the joint, and possibly adjacent items, to damage. Many times, a press may be used. However, such presses are prone to slipping off and possibly causing damage or injury. Other methods that may use a hammer or a pry bar are even more dangerous.

As those who have ever worked with heavy-duty joints will attest, replacing them with a punch and hammer requires a great deal of physical exertion and time spent ensuring that the positioning is correct. Further, there is often times inadequate space to swing a hammer with the necessary force to remove the joint. Accordingly, there is a need for a means by which an individual can quickly and easily remove heavy-duty universal joints or Spicer® joints without the numerous difficulties described above. The development of the present invention fulfills this need while adding ease of use and efficiency.

U.S. Pat. No. 7,115,037 issued to Schlegelmann et al. discloses a universal joint and method of servicing a staked universal joint. This patent does not appear to disclose a tool device and method for quickly and easily removing heavy duty universal joints for servicing.

U.S. Pat. No. 7,051,412 issued to Hurtado discloses a universal joint tool. This patent does not appear to disclose a tool device that bolts onto the universal joint and when manipulated quickly and easily removes a heavy duty universal joint.

U.S. Pat. No. 6,907,667 issued to Joyner and Oess discloses a method for fabricating the assembly of a universal joint. This patent does not appear to disclose a tool device and method of using the tool device to quickly and easily removing heavy duty universal joints for servicing.

U.S. Pat. No. 6,324,740 issued to Siedler discloses a universal joint disassembly tool. This patent does not appear to disclose a tool device that bolts onto the universal joint and does not use a hexagonal feature to displace the bearing cup.

U.S. Pat. No. 5,857,252 issued to Jansen discloses a press for installing universal joint bearing cups. This patent does not appear to disclose a tool device and method for quickly and easily removing heavy duty universal joints for servicing.

U.S. Pat. No. 4,977,660 issued to Maynard discloses a tool for removing or mounting a bearing cup. This patent does not appear to disclose a tool device that bolts onto the universal joint and when manipulated quickly and easily removes a heavy duty universal joint.

U.S. Pat. No. 3,786,544 issued to Ferguson discloses a process and apparatus for universal joint disassembly and assembly. This patent does not appear to disclose a tool device that bolts onto the universal joint and when manipulated quickly and easily removes a heavy duty universal joint.

The prior art appears to disclose various tools for working on universal joints, either to insert a bearing cup or remove a bearing cup. The prior art does not appear to disclose a removal tool device that bolts onto the universal joint and utilizes a to mounted hexagonal feature connected to a driver shaft to quickly, safely, and easily remove a bearing cup from a universal joint.

SUMMARY OF THE INVENTION

In view of the foregoing disadvantages inherent in the prior art, it has been observed that there is need for a universal joint extraction tool that is compact, easy to use and that maximizes operator protection.

The universal joint extracting tool provides a convenient and easy method and method for heavy duty universal joint or Spicer® joint extraction.

The universal joint extracting tool comprises a metal baseplate approximately four (4) inches long by two (2) inches wide and one-half (½) inch thick possessing two mounting bolts which mount the device to an existing universal joint.

The universal joint extracting tool possesses a driver shaft which presses and extracts the universal joint caps.

The universal joint extracting tool facilitates the removal of the universal joint caps without slipping or repositioning itself while in use.

The universal joint extracting tool comprises a base plate, a driver weldment, a pair of mounting bolts, a driver shaft, a hexagon feature, a clearance aperture and a pair of mounting apertures.

The universal joint extracting tool provides an anchoring attachment means to a universal joint via a base plate and a pair of particularly positioned and sized mounting bolts which attach thereto a pair of corresponding threaded holes located thereupon an existing heavy-duty universal joint.

The universal joint extracting tool possesses at a central position along the top surface of said base plate, a driver weldment comprising a driver aperture.

The universal joint extracting tool driver weldment provides fine pitch female machine threads which engage corresponding thereto male threads contained at a distal end of the driver shaft. The driver shaft is located in-line with the universal joint shaft to facilitate a pressing action. The driver shaft further comprises an integral hexagon feature located at a proximal end of said driver shaft which provides a rotating attachment means using a wrench type tool, thereby rotatingly engaging the universal joint cap, thereby initiating a pressing and removal action therefrom.

The universal joint extracting tool driver shaft is envisioned to be approximately five (5) inches long and three-quarter (¾) inches in diameter containing fine machine threads over an entire length thereof.

The universal joint extracting tool clearance aperture allows the driver shaft to pass therethrough the base plate making subsequent contact with the universal joint. The mounting apertures provide an alignment means to the mounting bolts during insertion through the base plate.

The base plate and the driver weldment are envisioned to be permanently joined to one another preferably using a welding process; however, other methods of joining may be employed such as machining said components from a common piece of steel; using fasteners such as bolts, screws; or the like, and as such, should not be interpreted as a limiting factor of the invention.

The base plate and the driver weldment are further envisioned being made using heat-treated tool steel capable of withstanding anticipated stresses during use.

The driver shaft and mounting bolts are envisioned to comprise high tensile steel fasteners capable of impact torque.

The universal joint extracting tool may be used by performing the following steps: exposing the threaded mounting holes on an existing heavy-duty universal joint by removing a single spot welded retainer cap plate using a grinder or other appropriate tool; aligning the mounting aperture portions of the invention with the existing cap bolt holes; installing the two (2) mounting bolts therethrough the mounting apertures and threadingly engaging said mounting bolts thereinto existing retainer cap bolt holes by turning said mounting bolts clockwise until tight using a wrench type tool; screwing the driver shaft into the driver aperture until said driver shaft contacts the heavy-duty universal joint shaft; pressing the universal joint cap, located on an opposite side, from the universal joint casting by applying sufficient torque to the hexagon feature in a clockwise direction using a wrench type tool; removing the device from the universal joint following extraction thereof by removing the two (2) mounting bolts; storing the device until needed again; and, benefiting from reduced effort and time required to extract heavy-duty universal joints using the present invention.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| | |
|---|---|
| 10 | universal joint extracting tool |
| 20 | base plate |
| 21 | driver weldment |
| 22 | mounting aperture |
| 23 | driver aperture |
| 24 | clearance aperture |
| 30 | hexagon feature |
| 31 | driver shaft |
| 40 | mounting bolt |
| 50 | universal joint |

DETAILED DESCRIPTION OF THE PREFERRED EMBODIMENT

Figure 1:
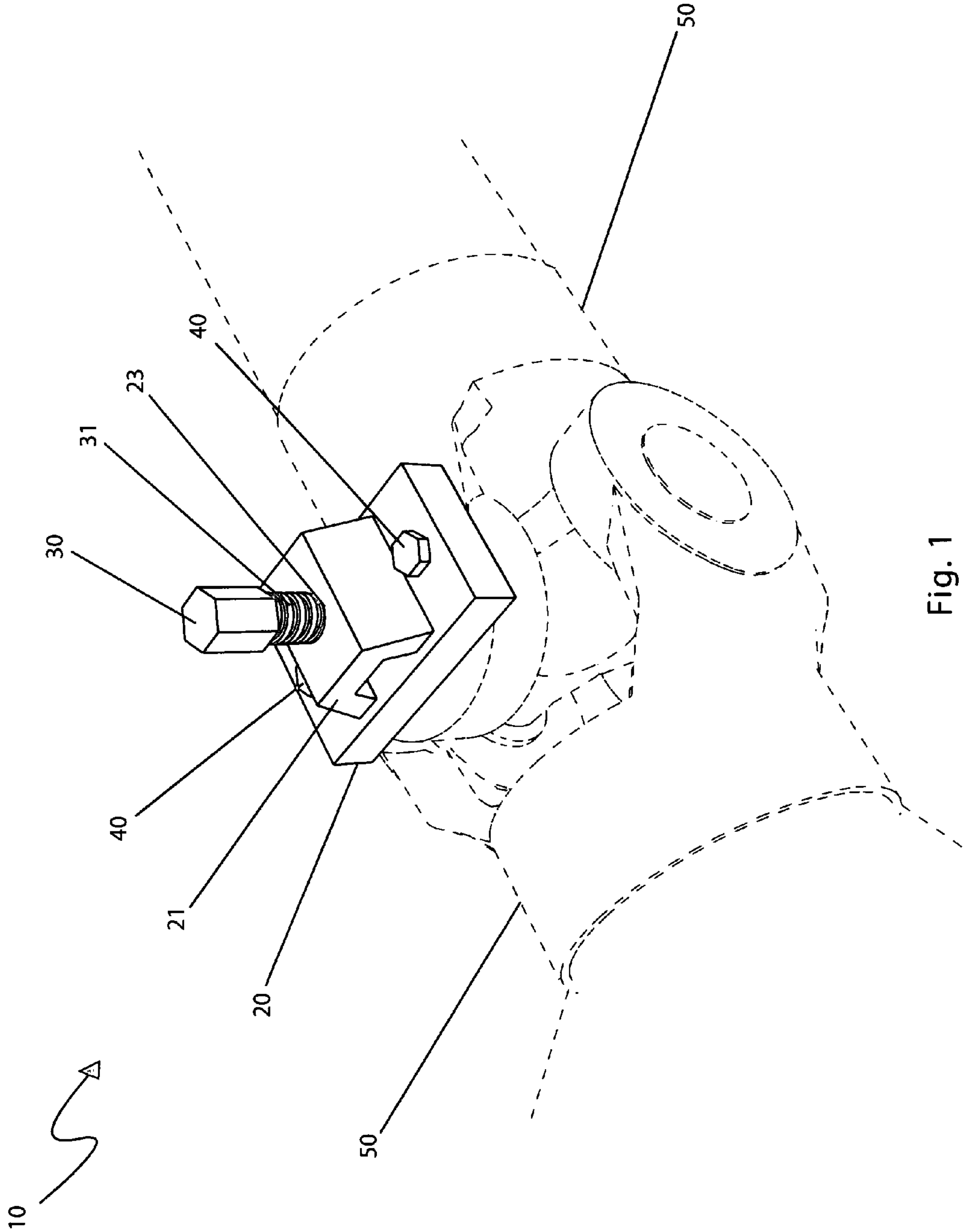
FIG. 1 is an environmental view of a universal joint extracting tool 10, according to a preferred embodiment of the present invention; and, FIG. 2 is an exploded view of a universal joint extracting tool 10, according to a preferred embodiment of the present invention.
Figure 2:
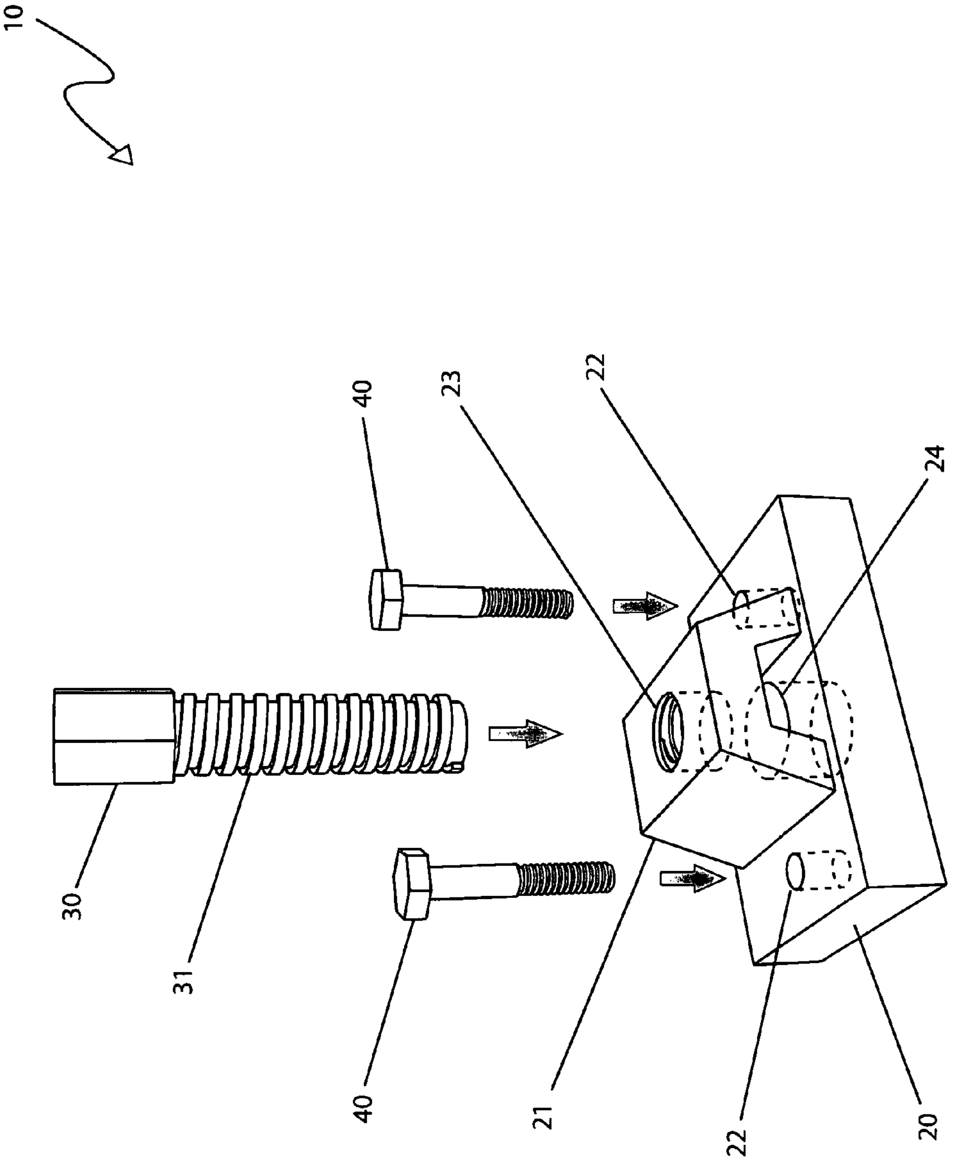

The best mode for carrying out the invention is presented in terms of its preferred embodiment, herein depicted within FIGS. 1 and 2. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a device and method for a universal joint extracting tool (herein described as the "device") 10, which provides a means for a tool that aids in the removal of heavy-duty universal joints 50 or Spicer® joints 50. The device 10 comprises a metal base plate 20 approximately four (4) inches long by two (2) inches wide and one-half (½) inch thick having two mounting bolts 40 which mount the device 10 to an existing universal joint 50. The device 10 provides a driver shaft 31 which presses and extracts the universal joint caps 50. The device 10 facilitates the removal of the universal joint caps 50 without slipping or reposition itself while in use.

Referring now to FIG. 1, an environmental view of the device 10, according to the preferred embodiment of the present invention, is disclosed. The device 10 is illustrated here in use being attached to a heavy-duty universal joint 50 or Spicer® type joint 50. The device 10 comprises a base plate 20, a driver weldment 21, a pair of mounting bolts 40, a driver shaft 31, and a hexagon feature 30. The device 10 provides an anchoring attachment means to a universal joint 50 via a base plate 20 and a pair of particularly positioned and sized mounting bolts 40 which attach thereto a pair of corresponding threaded holes located thereupon an existing heavy-duty universal joint 50. Located at a central position along a top surface of the base plate 20 is a driver weldment 21 comprising a driver aperture 23. The driver aperture 23 provides fine pitch female machine threads which engage corresponding thereto male threads contained at a distal end of the driver shaft 31. The driver shaft 31 is located in-line with the universal joint shaft 50 to facilitate a pressing action. The driver shaft 31 further comprises an integral hexagon feature 30 located at a proximal end of said driver shaft 31 which provides a rotating attachment means using a wrench type tool, thereby rotatingly engaging the universal joint cap 50, thereby initiating a pressing and removal action therefrom.

Referring now to FIG. 2, an exploded view of the device 10, according to the preferred embodiment of the present invention, is disclosed. The device 10 comprises a base plate 20, a driver weldment 31, a driver shaft 31, a clearance aperture 24, and a pair of mounting apertures 22. The driver shaft 31 is envisioned to be approximately five (5) inches long and three-quarter (¾) inch in diameter containing fine machine threads over an entire length thereof. The clearance aperture 24 allows the driver shaft 31 to pass therethrough the base plate 20 making subsequent contact with the universal joint 50. The mounting apertures 22 provide an alignment means to the mounting bolts 40 during insertion through the base plate 20.

The base plate 20 and the driver weldment 21 are envisioned to be permanently joined to one another preferably using a welding process; however, other methods of joining may be employed such as machining said components from a common piece of steel; using fasteners such as bolts, screws; or the like, and as such, should not be interpreted as a limiting factor of the invention 10. The base plate 20 and the driver weldment 21 are further envisioned being made using heat-treated tool steel capable of withstanding anticipated stresses during use.

The driver shaft 31 and mounting bolts 40 are envisioned to comprise high tensile steel fasteners capable of impact torque.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIG. 1.

The method of utilizing the device 10 may be achieved by performing the following steps: exposing the threaded mounting holes on an existing heavy-duty universal joint 50 by removing a single spot welded retainer cap plate 50 using a grinder or other appropriate tool; aligning the mounting aperture portions 22 of the invention 10 with the existing cap bolt holes 50; installing the two (2) mounting bolts 40 therethrough the mounting apertures 22 and threadingly engaging said mounting bolts 40 thereinto existing retainer cap bolt holes 50 by turning said mounting bolts 40 clockwise until tight using a wrench type tool; screwing the driver shaft 31 into the driver aperture 23 until said driver shaft 31 contacts the heavy-duty universal joint shaft 50; pressing the universal joint cap 50, located on an opposite side, from the universal joint casting 50 by applying sufficient torque to the hexagon feature 30 in a clockwise direction using a wrench type tool; removing the device 10 from the universal joint 50 following extraction thereof by removing the two (2) mounting bolts 40; storing the device 10 until needed again; and, benefiting from reduced effort and time required to extract heavy-duty universal joints 50 using the present invention 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A universal joint extracting tool for assisting a user to remove an existing universal joint from a fastened positioned, said universal joint extracting tool comprising:

- a base plate having a plurality of spaced mounting holes formed therein and extending from a top surface of said base plate to a bottom surface of said base plate respectively;
- a plurality of mounting bolts removably positioned through said mounting holes and being engaged with the existing universal joint respectively;
- a driver weldment directly attached to said top surface of said base plate and extending upwardly therefrom; and,
- a driver shaft adjustably penetrated through said base plate in such a manner that an external force is releasably exerted against the existing universal joint after said driver shaft passes through said bottom surface of said base plate;
- wherein said base plate has a planar top-most surface and a planar bottom-most surface disposed parallel thereto along an entire longitudinal length of said base plate;
- wherein said mounting bolts are spaced apart from left and right sides of said driver weldment;
- wherein said left and right sides of said driver weldment extend downwardly and away from said driver shaft, said left and rights sides of said driver weldment terminating at said top-most surface of said base plate; and,
- wherein a bottom-most surface of each of said left and right sides of said driver weldment remains directly engaged with said top-most surface of said base plate.

2. The universal joint extracting tool of claim 1, wherein said driver weldment is provided with a driver aperture centrally formed therein and configured in such a manner that said driver aperture contiguously extends from a top surface of said driver weldment and terminates at a bottom surface of said driver weldment.

3. The universal joint extracting tool of claim 2, wherein said driver aperture has a threaded interior surface that is threadably mated with said driver shaft.

4. The universal joint extracting tool of claim 2, wherein said driver shaft comprises: integrally mated top and bottom portions, said top portion having a hexagonal shape and said bottom portion having a threaded outer surface threadably mated with said driver aperture;

- wherein said hexagonal top portion remains exposed exterior of said driver aperture and further disposed above said driver weldment.

5. The universal joint extracting tool of claim 2, wherein said base plate is provided with a clearance aperture formed therein and registered parallel to said driver aperture.

6. The universal joint extracting tool of claim 5, wherein said clearance aperture is vertically aligned with said driver aperture and disposed subjacent thereto, said clearance aperture being centrally seated between said mounting holes and directly below said driver aperture such that said driver shaft passes through said driver aperture and said clearance aperture prior to making contact with the existing universal joint.

7. The universal joint extracting tool of claim 5, wherein said base plate is permanently joined directly to said driver weldment and configured in such a manner that said driver aperture and said clearance aperture remain spaced apart and oriented along a common vertical plane respectively.

8. A universal joint extracting tool for assisting a user to remove an existing universal joint from a fastened positioned, said universal joint extracting tool comprising:

- a base plate having a plurality of spaced mounting holes formed therein and extending from a top surface of said base plate to a bottom surface of said base plate respectively;
- a plurality of mounting bolts removably positioned through said mounting holes and being engaged with the existing universal joint respectively;
- a driver weldment directly attached to said top surface of said base plate and extending upwardly therefrom; and,
- a driver shaft adjustably penetrated through said base plate in such a manner that an external force is releasably exerted against the existing universal joint after said driver shaft passes through said bottom surface of said base plate;
- wherein said driver shaft has a longitudinal length that is greater that a combined longitudinal thickness of said base plate and said driver weldment so that said driver shaft is penetrated completely through said base plate and said driver weldment respectively; and, wherein an outer-most perimeter of said driver weldment is spaced inwardly from an outer-most perimeter of a top-most surface of said base plate.

9. The universal joint extracting tool of claim 8, wherein said driver weldment is provided with a driver aperture centrally formed therein and configured in such a manner that said driver aperture contiguously extends from a top surface of said driver weldment and terminates at a bottom surface of said driver weldment.

10. The universal joint extracting tool of claim 9, wherein said driver aperture has a threaded interior surface that is threadably mated with said driver shaft.

11. The universal joint extracting tool of claim 9, wherein said driver shaft comprises:

integrally mated top and bottom portions, said top portion having a hexagonal shape and said bottom portion having a threaded outer surface threadably mated with said driver aperture;

wherein said hexagonal top portion remains exposed exterior of said driver aperture and further disposed above said driver weldment.

12. The universal joint extracting tool of claim 9, wherein said base plate is provided with a clearance aperture formed therein and registered parallel to said driver aperture.

13. The universal joint extracting tool of claim 12, wherein said clearance aperture is vertically aligned with said driver aperture and disposed subjacent thereto, said clearance aperture being centrally seated between said mounting holes and directly below said driver aperture such that said driver shaft passes through said driver aperture and said clearance aperture prior to making contact with the existing universal joint.

14. The universal joint extracting tool of claim 12, wherein said base plate is permanently joined directly to said driver weldment and configured in such a manner that said driver aperture and said clearance aperture remain spaced apart and oriented along a common vertical plane respectively.

* * * * *